(12) United States Patent
Ono

(10) Patent No.: US 6,192,197 B1
(45) Date of Patent: Feb. 20, 2001

(54) INSTANT PHOTO FILM PACK

(75) Inventor: Minoru Ono, Kanagawa (JP)

(73) Assignee: Fuji Photo Film Co., Ltd., Kanagawa (JP)

(*) Notice: Under 35 U.S.C. 154(b), the term of this patent shall be extended for 0 days.

(21) Appl. No.: 09/362,675

(22) Filed: Jul. 29, 1999

(30) Foreign Application Priority Data

Aug. 10, 1998 (JP) .................................................. 10-226068

(51) Int. Cl.⁷ .................................................. G03B 17/50
(52) U.S. Cl. .................................... 396/30; 396/32; 396/34; 396/36
(58) Field of Search ........................... 396/30, 36, 527, 396/583, 32, 34; 206/455

(56) References Cited

U.S. PATENT DOCUMENTS

| | | | |
|---|---|---|---|
| 2,946,270 | 7/1960 | Eloranta | 396/36 |
| 4,553,936 | * 11/1985 | Wang | 433/37 |
| 4,637,703 | 1/1987 | Ono et al. | 396/527 |
| 4,804,988 | * 2/1989 | Hashimoto et al. | 396/527 |

OTHER PUBLICATIONS

Communication from a Foreign Patent Office EP—Search Report.

* cited by examiner

Primary Examiner—D. Rutledge
(74) Attorney, Agent, or Firm—Sughrue, Mion, Zinn, Macpeak & Seas, PLLC (57) ABSTRACT

An instant photo film pack to be loaded in a pack holder is constituted by a box-shaped pack case which contains stacked self-developing photo film units of a peel-apart type. The pack case has an exposure opening formed in an upper wall thereof and a passage opening formed with a front wall thereof. A pressure plate is disposed in the pack case, and provided with a pair of lateral walls so as to separate an inside of the pack case into upper and lower chambers. Each of the photo film units includes a photosensitive sheet contained in the upper chamber. An image receiving sheet is contained in the lower chamber. A withdrawing sheet has an edge connected with the photosensitive sheet. A developing solution pod is disposed on the withdrawing sheet, for containing developing solution. A mask sheet has an edge connected with the withdrawing sheet. A mask opening is formed in the mask sheet. The image receiving sheet is disposed behind the mask opening to close the mask opening, and secured thereto in a peelable manner. The improved instant photo film pack is constituted by the pack case and the pressure plate being plastic molded pieces. A biasing force transmission member is disposed on a bottom wall of the pack case, for transmitting the biasing force of a spring member on an inside of the pack holder to the pressure plate, to push the pressure plate toward the exposure opening.

11 Claims, 7 Drawing Sheets

INSTANT PHOTO FILM PACK

BACKGROUND OF THE INVENTION

1. Field of the Invention

The present invention relates to an instant photo film pack. More particularly, the present invention relates to an instant photo film pack which includes plastic parts with minimized use of other materials, so as to facilitate abandonment after being used.

2. Description Related to the Prior Art

A self-developing photo film unit is known, examples of which are a mono-sheet type and a peel-apart type. U.S. Pat. No. 4,637,703 (corresponding to JP-Y (Japanese Utility Model Publication No.) 5-62725) discloses the peel-apart type, which includes a photosensitive sheet and an image receiving sheet contained in a pack case in a manner spaced from one another. After the photosensitive sheet is exposed, the photo film unit is advanced by a pair of spreader rollers between them by pulling out of a withdrawing sheet. The photosensitive sheet and an image receiving sheet are laid on one another by the advancing operation. Furthermore a developing solution pod is squeezed to spread the developing solution between the photosensitive sheet and an image receiving sheet.

Figure 5:
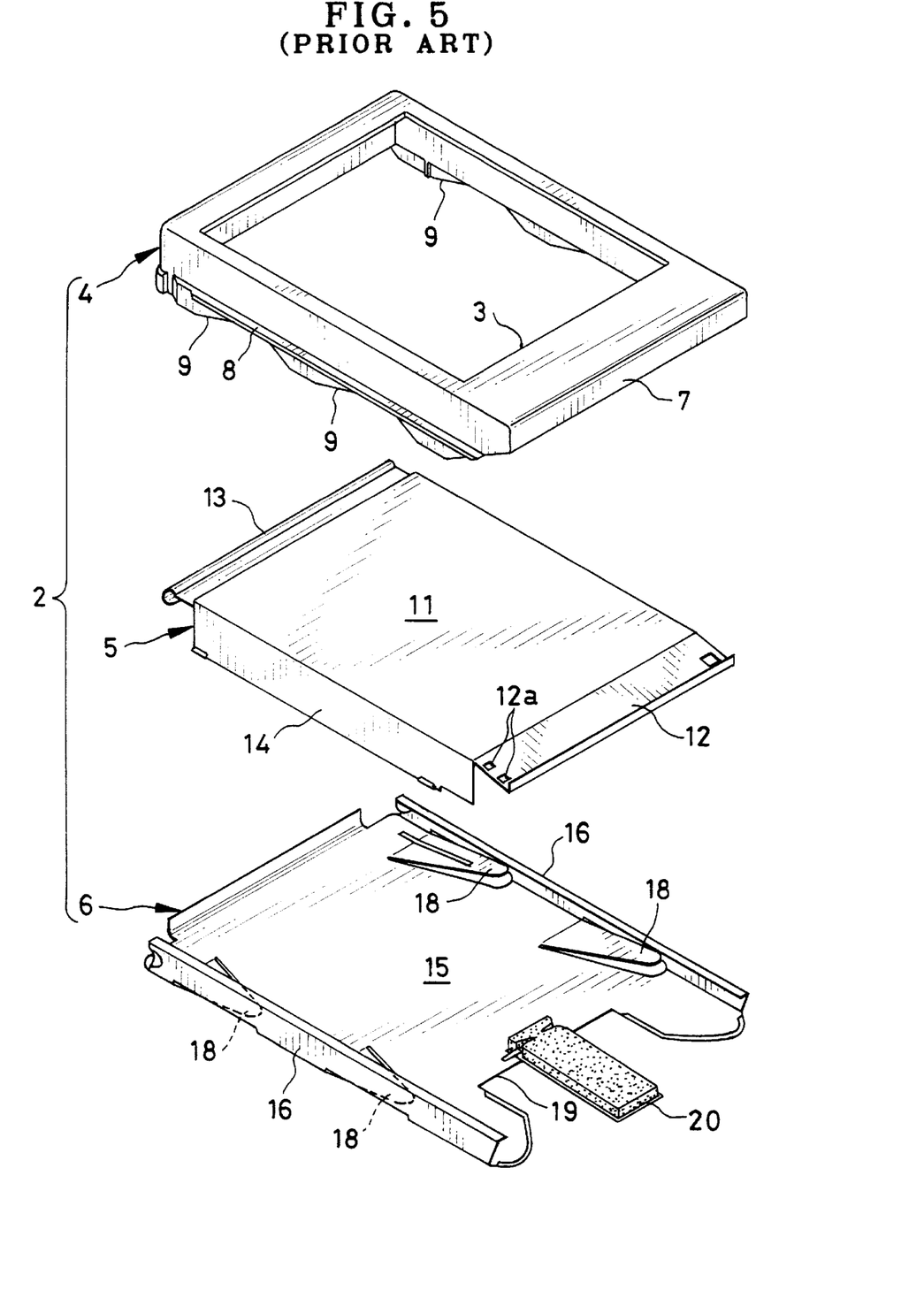
FIG. 5 is an exploded perspective illustrating a pack case of an instant photo film pack according to the prior art.

In FIG. 5, an instant photo film pack for containing self-developing photo film units of the peel-apart type is illustrated. A pack case 2 is constituted by a pack body 4 and a bottom cover member 6. The pack body 4 is an upper component and has a box shape of a substantially rectangular parallelepiped. The bottom cover 6 is a bottom component closing a bottom opening of the pack body 4. A pressure plate 5 is contained between the pack body 4 and the bottom cover 6. There is an exposure opening 3 formed in the pack body 4. The pack body 4 is a plastic molded piece molded by injection molding, which is advantageous in that ambient light can be effectively shielded at corners of the pack body 4, and that the pack body 4 can be produced at a low cost. A bottom edge of an end wall 7 with a passage opening is in such a position that its level is higher than a bottom edge of an end wall or lateral side walls, so that the passage opening for advance of the photo film units is defined under the end wall 7 when the bottom cover 6 is secured to the pack body 4.

Ridges 8 are formed with respectively lateral walls of the pack body 4. Cutouts 9 are formed in the bottoms of the lateral walls of the pack body 4 and located under the ridges 8. The pressure plate 5 is produced according to pressing from a thin plate of metal. A front edge of a flat middle wall 11 is provided with a retaining portion 12 for photo film units. A curved portion 13 is disposed on a rear edge of the flat middle wall 11. First and second lateral walls 14 are disposed on lateral sides of the flat middle wall 11 and oriented vertically downwards by bending. There are a pair of retaining holes 12a formed in the end of the retaining portion 12, for the purpose of retention of ends of the photo film units.

The bottom cover 6 is formed according to pressing from a thin plate of metal. A middle wall 15 of the bottom cover 6 is provided with lateral walls 16 disposed along its lateral sides. Top edges of the lateral walls 16 are bent in inward directions. When the bottom cover 6 is mounted on the pack body 4 by sliding the bottom cover 6 along bottom edges of the pack body 4, the ridges 8 on lateral walls of the pack body 4 are covered by the lateral walls 16 before the bottom cover 6 is connected with the pack body 4.

Spring portions 18 are formed by bending, and disposed on the lateral sides of the middle wall 15. When the pressure plate 5 is contained in the pack body 4 and the bottom cover 6 is secured to the pack body 4, the spring portions 18 push up bottom edges of the first and second lateral walls 14, and bias the pressure plate 5 toward the exposure opening 3. A recess 19 is formed in a front edge of the middle wall 15. A sponge pad 20 is secured to the inside of the recess 19 and protrudes in a withdrawing direction.

The sponge pad 20 is constituted by a paper base member and a part of sponge or polyurethane foam attached to a top face of the paper base member. As will be described later, the sponge pad 20 keeps an image receiving sheet from moving before a photosensitive sheet moves to a predetermined position in the course of withdrawal of each exposed photo film unit.

Figure 6:
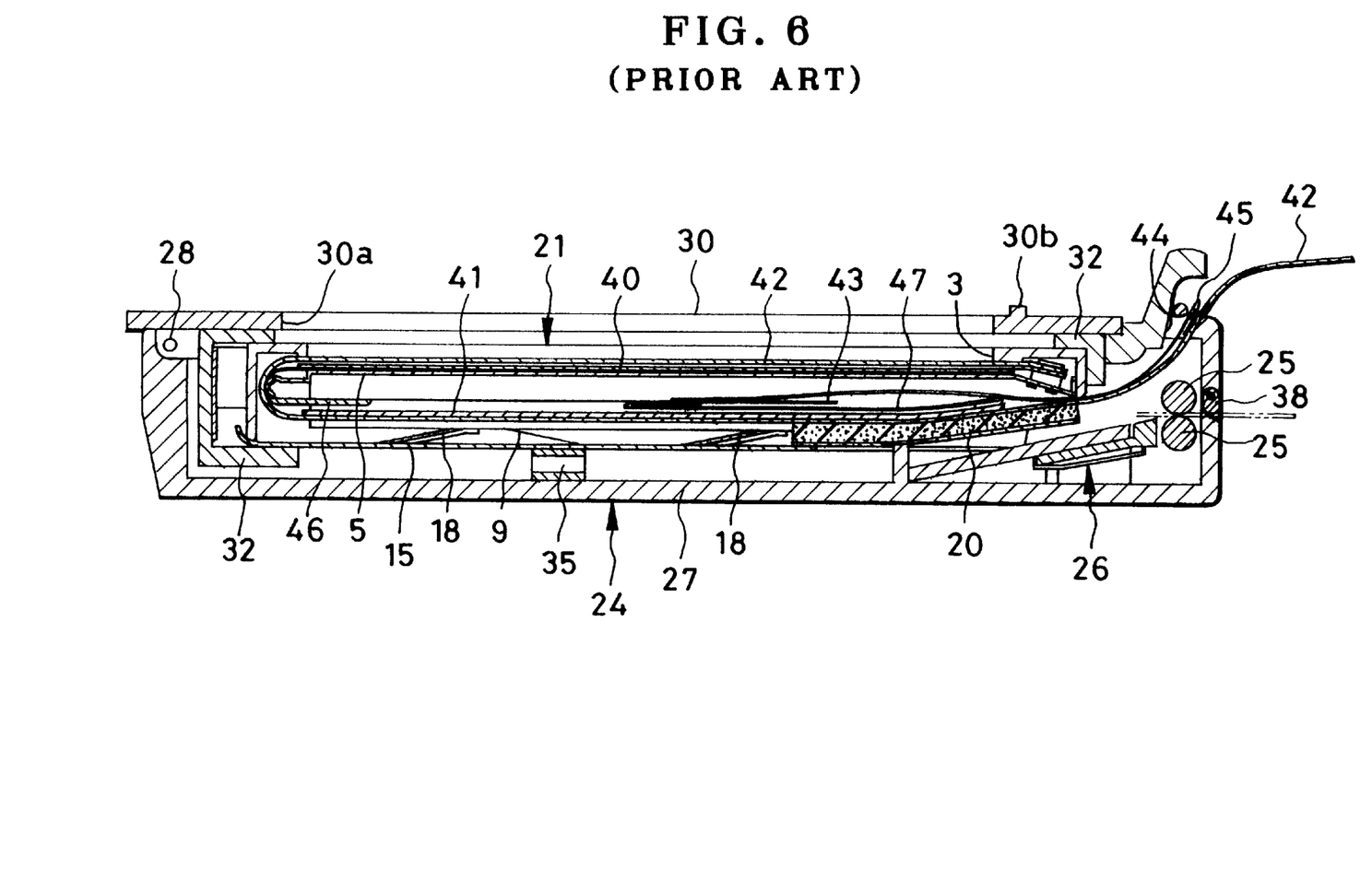
FIG. 6 is a vertical section illustrating the photo film pack and the pack holder loaded therewith according to the prior art.

An instant photo film pack 21 is constituted by the pack case 2 and the photo film units contained in the pack case 2. In FIG. 6, the instant photo film pack 21, when used, is loaded in a pack holder 24. The pack holder 24 is also referred to as a camera back, and includes a first plate 30 and a second plate 27 of a holder body. The second plate 27 is provided with a roller assembly 26 including a pair of spreader rollers 25. The first plate 30 is connected with the second plate 27 in a manner rotatable about a pivot 28. A holder opening 30a is formed in the first plate 30, which is used in such a state that a surface of the first plate 30 is tightly contacted by a back surface of an instant camera. Also there is a ridge 30b adapted to positioning of the pack holder 24 on the back of the instant camera.

In FIG. 6, first and second spring portions 35 of a spring plate push the bottom cover 6 of the instant photo film pack 21, and keep the instant photo film pack 21 pushed upwards. Thus a top face of the pack case 2 is pressed against an upper inside face of a pack support frame 32, so as to position the instant photo film pack 21 suitably in a direction parallel to an optical axis of a photographic light path.

As is well-known in the art, a self-developing photo film unit includes a photosensitive sheet 40 and an image receiving sheet 41, which are contained respectively above and below the pressure plate 5 inside the pack case 2. When all of the stacked photo film units are unused, the exposure opening 3 is closed by a light-shielding sheet 42. There are 10 photo film units contained in the pack case 2. But only one photo film unit is depicted in FIG. 6 with the light-shielding sheet 42 for the purpose of simplification of the depiction. A withdrawing sheet 43 is connected with the photosensitive sheet 40 and the image receiving sheet 41. The photosensitive sheet 40 is located between the exposure opening 3 and the pressure plate 5. The image receiving sheet 41 is disposed under the pressure plate 5 and oriented downwards.

There is a tab exit slot 44, which is defined between the second plate 27 and the first plate 30, and through which a distal end of the light-shielding sheet 42 is protruded when the instant photo film pack 21 is contained in the pack holder 24. A remaining end of the light-shielding sheet 42 is fastened to the pressure plate 5 together with the photo film units by staples or wire chips used with a stapler. When the protruding distal end at the tab exit slot 44 is manually drawn out, the remaining end of the light-shielding sheet 42 is torn away from the staple-fastened portion by means of a perforation line or notches, so that the light-shielding sheet 42 is separated and withdrawn out of the tab exit slot 44 as one sheet. Thus a first one of the photosensitive sheets 40 comes to lie on the exposure opening 3 and becomes ready for being exposed. The distal end of the light-shielding sheet 42 is provided with a tab 45 of the first photo film unit. The tab 45 has one end attached to one end of the withdrawing sheet 43 of the photo film unit. When the light-shielding sheet 42 is removed, the end of the tab 45 comes to protrude from the tab exit slot 44.

The spring portions 18 on the middle wall 15 of the pack case 2 contact bottom edges of the first and second lateral walls 14 of the pressure plate 5, which is kept pushed up by the spring portions 18. Thus the photosensitive sheet 40 is moved up with the pressure plate 5, and pressed against an upper inside face of the pack case 2. The photosensitive sheet 40 remains positioned constantly inside the pack case 2 in a state ready to be exposed.

The tab 45 is manually pulled out after an exposure is taken through the holder opening 30a of the pack holder 24 and the exposure opening 3 of the pack case 2. The withdrawing sheet 43 is caused to move to the spreader rollers 25. As indicated by the phantom line, an end of the withdrawing sheet 43 is moved between the spreader rollers 25, pushes open the exit door at a photo film exit slot 38 and exits through the photo film exit slot 38. At this time, the attached portion of the tab 45 to the withdrawing sheet 43 is located directly under the tab exit slot 44. Therefore the force of pulling the tab 45 peels the tab 45 from the withdrawing sheet 43. When the tab 45 of the first photo film unit is completely peeled, the tab 45 of a second one of the photo film units comes to appear through the tab exit slot 44.

Then the withdrawing sheet 43 partially protruded from between the spreader rollers 25 is manually pinched and withdrawn. The photosensitive sheet 40 is moved horizontally to the left in the drawing, is turned back at the curved portion 13 of the pressure plate 5, and is moved to the bottom of the pressure plate 5. Now the exposed surface of the photosensitive sheet 40 is oriented downwards. A developing solution pod 46, which is disposed on the withdrawing sheet 43, is moved past the image receiving sheet 41 and comes nearer to the spreader rollers 25. There is a connector sheet 47 or mask sheet connecting the image receiving sheet 41 with the withdrawing sheet 43. When the mask sheet 47 is spread and fully unfolded, the exposed surface of the photosensitive sheet 40 comes to a position opposite to the image receiving sheet 41. The force of withdrawing the withdrawing sheet 43 causes the combination of the photosensitive sheet 40 and the image receiving sheet 41 to be moved toward the spreader rollers 25.

In the course of movement of the photosensitive sheet 40 to the image receiving sheet 41 in unfolding of the mask sheet 47, pressure and friction of the sponge pad 20 keep the image receiving sheet 41 from moving. Therefore the photosensitive sheet 40 and the image receiving sheet 41 are caused by the sponge pad 20 to lie completely on one another when moved to the position between the spreader rollers 25.

Shortly before the photosensitive sheet 40 and the image receiving sheet 41 come to a position between the spreader rollers 25, the solution pod 46 is squeezed by the spreader rollers 25. The developing solution in the solution pod 46 is spread between the photosensitive sheet 40 and the image receiving sheet 41 at a regularized thickness. After each photo film unit is completely pulled out of the spreader rollers 25, a predetermined time for development and fixation is elapsed. Then a positive image appears on the image receiving sheet 41, which is peeled away from the photo film unit to become a photographic print.

In the pack case 2 according to the prior art for containing the peel-apart type of photo film units, the spring portions 18 as portions of the bottom cover 6 of metal are essentially operated for pressing the pressure plate 5 toward the exposure opening 3 to position each photosensitive sheet. Also the sponge pad 20 on the bottom cover 6 is important at the time of pulling the withdrawing sheet 43 after an exposure, because the photosensitive sheet 40 and the image receiving sheet 41 must be advanced to the spreader rollers 25 after laying them on each other.

In accordance with the above construction, parts of the pack case 2 include various materials, such as metal, plastics, paper and sponge. The pack case 2 after using the photo film units is discarded as a waste. As the pack case 2 is a combination of the various materials, users must disassemble the pack case 2 and discard the parts in a classified manner. This is a laborious operation caused by the structure of the pack case 2. Also the users' hands are likely to be injured when disassembling the pack case 2.

In the manufacturing process of the instant photo film pack 21, the bottom cover 6 is finally mounted on the pack body 4 by sliding operation via the end wall of the pack body 4. It is likely that an edge of the bottom cover 6 of metal partially scratches the pack body 4 of the plastic material or the light-shielding sheet 42 of paper. Dust or particles may be created by scratching and scattered inside the pack case 2 to cause problems in taking an exposure or spreading the developing solution. For example, unexposed spots shaped like pinholes may be formed or spreading irregularities may occur. Also, users' hands are likely to be wounded by contact with the edges of the bottom cover 6 or metal part when they remove the instant photo film pack 21 from a packaging bag, because the edges of the metal part are tapered.

The pressure plate 5 and the bottom cover 6 are metal parts causing the instant photo film pack 21 to have a great weight. If the instant photo film pack 21 is dropped accidentally, the bottom cover 6 may be deformed by shock. The light-shielding sheet 42 and the photo film units are likely to be damaged, because they are broken away at portions fastened with staples or wire chips. If the instant photo film pack 21 is dropped with a packaging bag, corners of the metal parts are likely to strike and perforate the packaging bag, of which moisture-tightness is damaged. If the damaged packaging bag is still used, the photo film units in the instant photo film pack 21 are degraded inevitably.

If one desires abandonment of the pack case 2 without classification of parts, the pack body 4, the pressure plate 5 and the bottom cover 6 must be produced from the same material. However paper is not suitable for such material, because the spring portions 18 of the bottom cover 6 cannot easily have a resilient characteristic required for a spring. Also the absorbing operation of the sponge pad 20 cannot be easily obtained from paper material. There is a problem in that the use of paper is likely to create dust or powder in the course of manufacture. Furthermore, metal is not suitable as the common material for the pack case 2 including the pack body 4. The pack body 4 would be constituted by a bent form of a thin plate of metal. It is difficult to shield corners of the pack body 4 from ambient light. The large amount of weight and high manufacturing cost of the pack body 4 are also disadvantageous.

Should the pressure plate 5 and the bottom cover 6 be both plastic, no biasing operation of the spring portions 18 cannot be obtained only with resiliency of the plastic parts. Even if a first one of the photo film units is safely pressed to the exposure opening 3 by such plastic parts, succeeding ones of the photo film units may be insufficiently pressed, because the plastic parts exert only a biasing force smaller than that exerted to the first photo film unit. There occurs imprecision with which the photosensitive sheet of the succeeding photo film units is positioned in a direction of an photographic optical axis. Photographs cannot be taken in a sharply focused manner.

SUMMARY OF THE INVENTION

In view of the foregoing problems, an object of the present invention is to provide an instant photo film pack which includes plastic parts with minimized use of other materials, so as to facilitate abandonment after being used.

In order to achieve the above and other objects and advantages of this invention, an instant photo film pack loadable in a pack holder includes a pack and a plurality of stacked self-developing photo film units contained therein. The pack includes a box-shaped pack case and a pressure plate contained therein, the pack case having an exposure opening formed in an upper wall thereof and a passage opening formed with a front wall thereof, the pressure plate being provided with a pair of lateral walls so as to separate an inside of the pack case into upper and lower chambers. Each of the photo film units includes a photosensitive sheet contained in the upper chamber, an image receiving sheet contained in the lower chamber, a withdrawing sheet having an edge connected with the photosensitive sheet, a developing solution pod, disposed on the withdrawing sheet, for containing developing solution, a mask sheet having an edge connected with the withdrawing sheet, a mask opening formed in the mask sheet, the image receiving sheet being disposed behind the mask opening to close the mask opening, and secured thereto in a peelable manner. An improvement of the instant photo film pack comprises the pack case and the pressure plate being plastic molded pieces. A biasing force transmission member is disposed on a bottom wall of the pack case, for transmitting biasing force of a spring member on an inside of the pack holder to the pressure plate, to push the pressure plate toward the exposure opening.

The instant photo film pack further comprises a regulator mechanism, disposed on the second wall and close to the passage opening, for frictionally contacting respectively the image receiving sheets, to prevent the image receiving sheets from moving toward the passage opening after a start of pulling of respectively the auxiliary sheets and before one of the photosensitive sheets becomes laid on respectively the image receiving sheets.

By this construction, abandonment of the instant photo film pack is facilitated as all its main parts can be plastic.

The pack case includes a pack body having the first wall. A bottom cover has the second wall, and is secured to the pack body, the passage opening being defined between the pack body and the bottom cover.

The pack holder includes a holder body for containing the instant photo film pack, an upper cover plate for closing the holder body in an openable manner, the spring member disposed on an inside of the holder body for pushing the pack toward the upper cover plate, a holder opening positioned with the exposure opening in the pack case, a pair of spreader rollers for spreading the developing solution between the photosensitive sheet and the image receiving sheet by squeezing the solution pod, a photo film exit slot, formed in a front end wall of the holder body, for passage of each of the photo film units passed between the spreader rollers.

The biasing force transmission mechanism includes at least one transmission opening formed in the second wall. At least one transmission flap is disposed to project from an edge of the transmission opening, and pushed by the spring member.

The bottom cover is one piece formed from plastic material and including the biasing force transmission mechanism.

Also, the bottom cover is one piece formed from plastic material and including the regulator mechanism.

The instant photo film pack further comprises a recess formed to retreat from an edge of the bottom cover and close to the passage opening. The regulator mechanism is a regulator flap disposed to project from the recess toward the passage opening.

The instant photo film pack further comprises plural projections or recesses, formed on the regulator mechanism in a pattern, for contacting the image receiving sheets.

The at least one transmission opening is first and second transmission openings disposed at respectively first and second lateral sides of the bottom cover extending in the first direction. The at least one transmission flap is first and second transmission flaps disposed at respectively first and second transmission openings and extended toward the pressure plate with an inclination.

The at least one spring member includes first and second spring portions arranged crosswise to the first direction, for pushing respectively the first and second lateral walls.

The instant photo film pack further comprises first and second cutouts, formed in first and second lateral edges of the pack body extending in the first direction, for receiving the first and second transmission flaps according to a decrease of the photo film units inside the pack case, to allow the pressure plate to come closer to the exposure opening.

The plastic material is at least one of polystyrene, ABS resin, polyphenyl ether, polycarbonate, polypropylene, fatty acid polyester, and polyvinyl alcohol.

According to another aspect of the present invention, the pack body, the bottom cover and the pressure plate are plastic molded pieces. The bottom cover is so associated with the pack body as to move with the pressure plate toward the exposure opening in response to biasing force of a spring member on an inside of the pack holder. A regulator member is disposed under the passage opening, for contacting a back surface of the image receiving sheet, to exert frictional force for preventing the image receiving sheet from moving toward the passage opening before the image receiving sheet becomes laid acceptably on the photosensitive sheet during pulling of each of the photo film units.

In a preferred embodiment, the pack body includes at least first and second lateral walls disposed on edges of the first wall erectly toward the bottom cover. The bottom cover includes a second wall, and at least third and fourth lateral walls, disposed on edges of the second wall erectly toward the first wall, adapted to mounting of the at least first and second lateral walls in a slidable manner thereon, for constituting the connecting mechanism. The pressure plate includes a middle wall for pushing the photosensitive sheets, and at least fifth and sixth lateral walls, disposed on edges of the middle wall erectly toward the bottom cover, and pushed by the bottom cover.

The pack body and the pressure plate satisfy a condition of:

$$H1 \leq H2$$

where H1 is a height of the first and second lateral walls with reference to a face of the first wall opposed to the pressure plate, and H2 is a height of the fifth and sixth lateral walls with reference to a face of the pressure plate opposed to the first wall.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
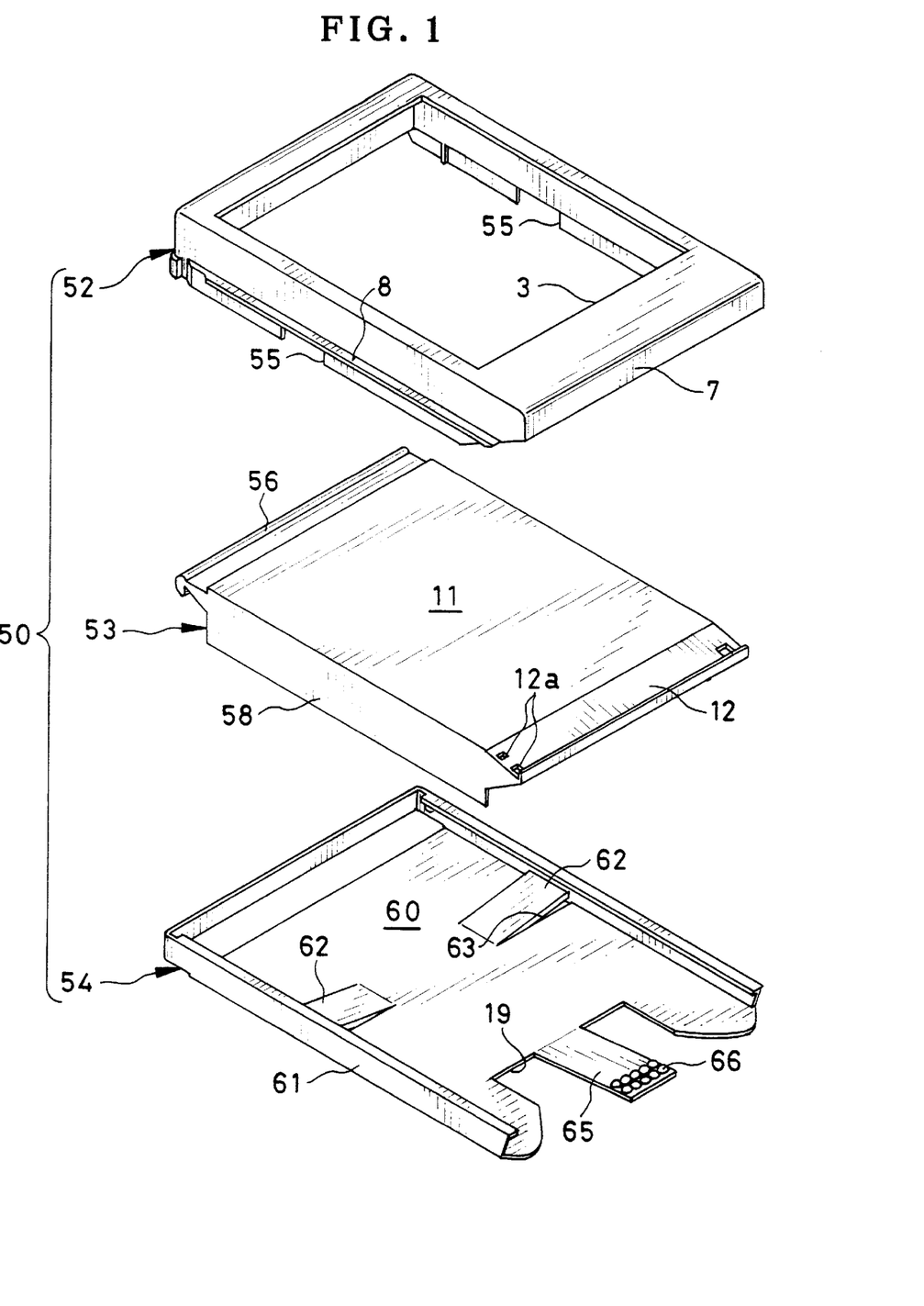
FIG. 1 is an exploded perspective illustrating a pack case of an instant photo film pack of the present invention.

In FIG. 1, an instant photo film pack includes a pack case 50, which is constituted by a pack body 52, a pressure plate 53 and a bottom cover member 54. The pack body 52 is an upper part of a case body, which is shaped in a box of a rectangular parallelepiped. The pressure plate 53 is a lower part of the case body. The bottom cover 54 is contained between the pack body 52 and the pressure plate 53. Any of the pack body 52, the pressure plate 53 and the bottom cover 54 is formed from plastic material. Examples of the plastic material is polystyrene, ABS resin, polyphenyl ether (PPE), polycarbonate, polypropylene, and other material with suitability to injection molding. Light-shielding material, for example carbon black, is initially added to the plastic material at approximately 1 wt. % for the purpose of shielding light.

It is also effective to use biodegradable plastic materials for the purpose of improve suitability of the pack case 50 to waste disposal. Examples of biodegradable plastic materials are synthetic material, material produced by fermentation, and material mainly including natural material, respectively to be precise, fatty acid polyester such as poly lactic acid, polyester produced by microbes, and polyvinyl alcohol (PVA) mainly including starch.

In the pack body 52, a bottom edge of an end wall 7 is positioned in a level higher than a bottom edge of the opposite end wall and bottom edges of the lateral walls of the pack body 52, so as to define a passage opening under the end wall. Ridges 8 are formed with respectively lateral walls of the pack body 52. First and second cutouts 55 are formed in the bottoms of the lateral walls of the pack body 52 and located under the ridges 8.

Figure 2:
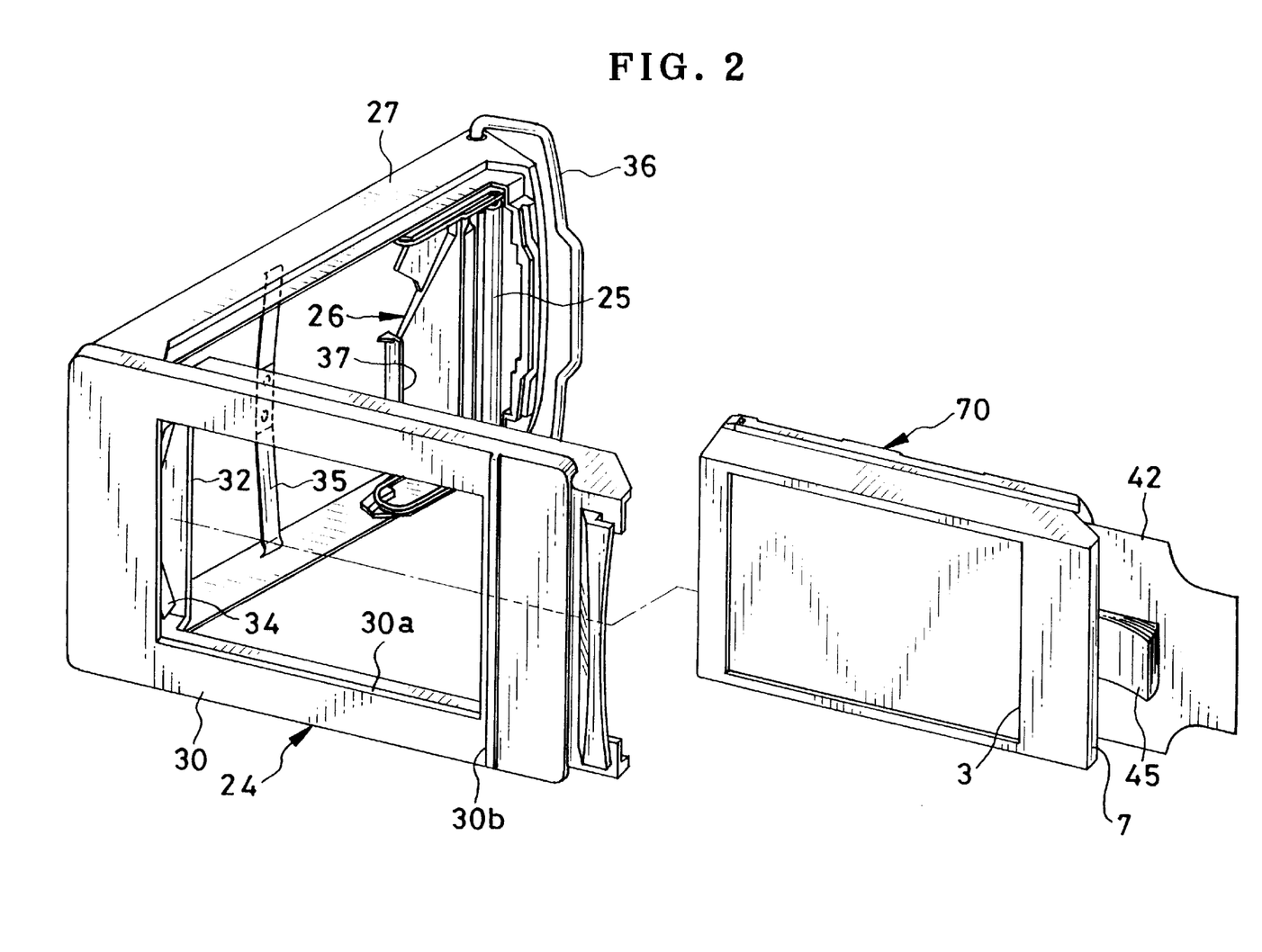
FIG. 2 is a perspective illustrating a pack holder and the photo film pack.
Figure 3A:
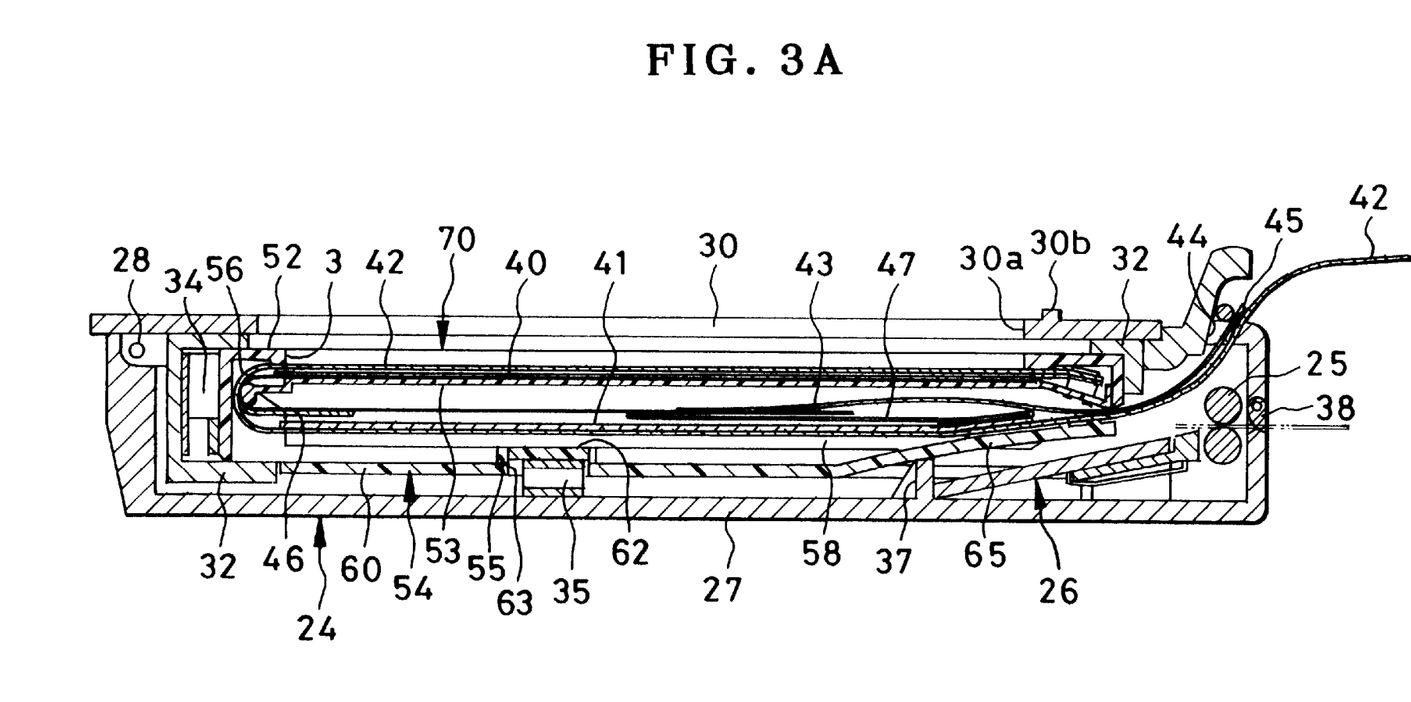
FIG. 3A is a vertical section illustrating the photo film pack and the pack holder loaded therewith.

An instant photo film pack 70 is constituted by the pack case 50 and the photo film units contained in the pack case 50. In FIGS. 2 and 3A, the instant photo film pack 70, when used, is loaded in a pack holder 24. The pack holder 24 is also referred to as a camera back, and includes a first plate 30 and a second plate 27 of a holder body. The second plate 27 is provided with a roller assembly 26 including a pair of spreader rollers 25. The first plate 30 is connected with the second plate 27 in a manner rotatable about a pivot 28. A holder opening 30a is formed in the first plate 30, which is used in such a state that a surface of the first plate 30 is tightly contacted by a back surface of an instant camera. Also there is a ridge 30b adapted to positioning of the pack holder 24 on the back of the instant camera.

A pack support frame 32 is disposed on the inside of the first plate 30, for receiving the instant photo film pack 70 fitted therein. When the instant photo film pack 70 is fitted in the pack support frame 32, a spring plate 34 in the pack support frame 32 pushes an end wall of the pack body 52. The end wall 7 of the pack body 52 is received by a remaining inside wall of the pack support frame 32. Thus the instant photo film pack 70 is stably held inside the pack support frame 32. Note that there is a camera of a type incorporating the pack holder. Such a pack holder does not have the first plate 30, so that the pack support frame 32 is fixedly supported on a body of the camera. The second plate 27 is mounted on the camera body in an openable manner. In relation to the loading of the instant photo film pack 70, the above description applies in the same manner.

A spring plate having first and second spring portions 35 is secured to an inner wall of the second plate 27. After insertion of the instant photo film pack 70 into the pack support frame 32, the first plate 30 is closed and fastened by fitting a clip member 36 thereon.

A projection 37 is disposed on the inner wall of the second plate 27. The projection 37 is adapted to positioning of the roller assembly 26 to the second plate 27. Also as illustrated in FIG. 3A, the projection 37 pushes a regulator flap 65 up from a middle wall 60 of the pack case 50. The roller assembly 26 being suitably positioned in the second plate 27, the spreader rollers 25 are located near to a photo film exit slot 38 of the second plate 27. Note that the photo film exit slot 38 is closed by an exit door, which is biased by a spring in a closed direction.

Figure 3B:
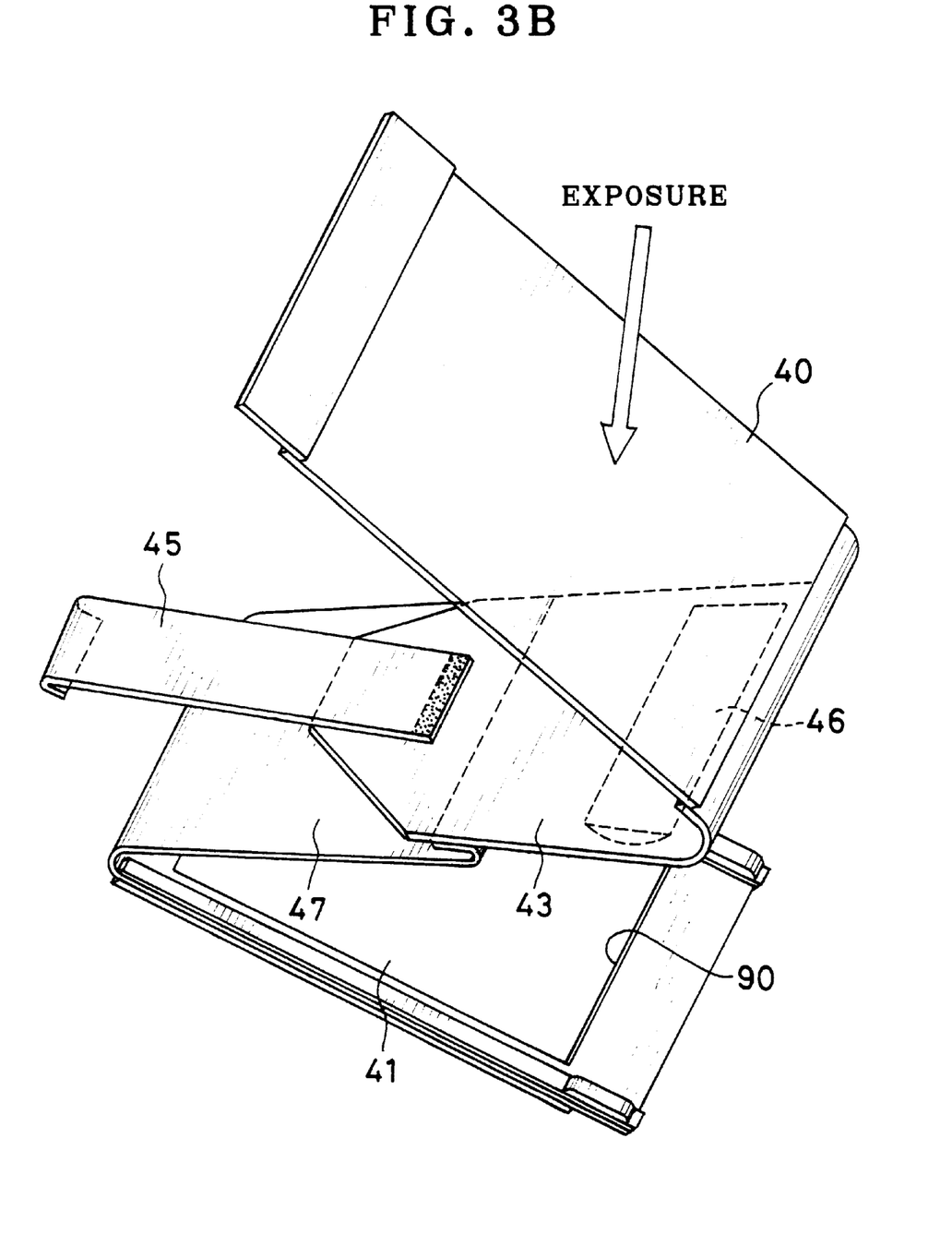
FIG. 3B is a perspective illustrating one of self-developing photo film units.

In FIG. 3B, a withdrawing sheet 43 in each one of the photo film units of the peel-apart type is a piece of paper of black color and has certain rigidity. A photosensitive sheet 40 is connected with a trailing edge of the withdrawing sheet 43. One edge of a mask sheet 47 is connected with a middle portion of the withdrawing sheet 43. The mask sheet 47 is a piece of thin patronen paper. A mask opening 90 is formed in the mask sheet 47 for defining a region within which an image should be transferred. An image receiving sheet 41 is connected with the rear of the mask sheet 47 in a peelable manner, and positioned to close the mask opening 90. A tab 45 is connected with the leading edge of the withdrawing sheet 43 in a peelable manner. A developing solution pod 46 is secured to the trailing edge of the withdrawing sheet 43 and contains developing solution. Among the photo film units, a second one is disposed between the photosensitive sheet 40 and the withdrawing sheet 43 of the first one.

The tab 45 protrudes externally from the set of the spreader rollers 25. After the photosensitive sheet 40 is exposed, the tab 45 is pulled manually, so that the withdrawing sheet 43 is moved toward the spreader rollers 25 and becomes overlapped gradually on the mask sheet 47 at the same time. The solution pod 46 in the course of this movement becomes squeezed between the withdrawing sheet 43 and the mask sheet 47. Then the photosensitive sheet 40 becomes overlapped gradually on the image receiving sheet 41 indirectly with the mask sheet 47. The tab 45 and the withdrawing sheet 43 are in positions between which one of the spreader rollers 25 are located. When the edge of the withdrawing sheet 43 becomes protruded from the spreader rollers 25, the tab 45 is peeled away from the withdrawing sheet 43.

When the withdrawing sheet 43 is pulled to advance, the solution pod 46 is squeezed between the spreader rollers 25 and torn open. The developing solution flows out of the solution pod 46, and is spread at a regularized thickness between the photosensitive sheet 40 and the image receiving sheet 41 in the mask opening 90.

When the photosensitive sheet 40 becomes laid on the image receiving sheet 41, the entirety of one photo film unit is pulled through the set of the spreader rollers 25. Upon a lapse of predetermined time, the image receiving sheet 41 is peeled away from the mask sheet 47. A positive image is created on the image receiving sheet 41 in a position where the mask opening 90 has been located.

The pressure plate 53 is a plastic piece molded by injection molding from the same material as the pack body 52. In the pressure plate 53, retaining holes 12a are formed in an end portion of a retaining portion 12 at the front end of a flat middle wall 11, and used for fastening the photo film units by staples or wire chips used with a stapler. A semi-cylindrical portion 56 is disposed on a rear end of the flat middle wall 11, and causes each photosensitive sheet to turn back in response to withdrawing operation of the photo film unit.

It is to be noted that the staples made of metal may be used for fastening ends of the photo film units to the pressure plate 53, but that plastic threads, pins or staples can be preferably used to fasten the photo film units to the pressure plate 53. This is remarkably effective in producing all the parts of the pack case from plastic material.

First and second lateral walls 58 are disposed on lateral sides of the flat middle wall 11 and oriented vertically downwards by bending. Even when the pressure plate 53 inside the pack body 52 is shifted to its uppermost limit position, a level of the bottom edge of the first and second lateral walls 58 is located within a vertical range of the first and second cutouts 55. In other words, sizes of the first and second cutouts 55 and the first and second lateral walls 58 are so determined that the bottom edge of the first and second lateral walls 58 does not come higher than the upper edge of the first and second cutouts 55 in a manner irrespective of a vertical level of the first and second lateral walls 58 inside the pack body 52.

The bottom cover 54 is also a plastic piece molded by injection molding from the same material as the pack body 52. The bottom cover 54 has the middle wall 60, of which lateral sides are provided with lateral walls 61 which are channel-shaped as viewed in section. To mount the bottom cover 54 on the pack body 52, the bottom cover 54 is slid in contact with the pack body 52 in the same manner as the prior art. The ridges 8 on lateral walls of the pack body 52 are covered by the lateral walls 61 before the bottom cover 54 is connected with the pack body 52.

In the middle wall 60, first and second transmission flaps 62 as a biasing force transmission mechanism are disposed in openings 63, for transmitting biasing force of the first and second spring portions 35 of the pack holder 24 to the pressure plate 53. To define the first and second transmission flaps 62, a cut line as a combination of three straight segments in a channel shape is predetermined on the middle wall 60, which is cut along the cut line. After the cutting, the middle wall 60 is subjected to an operation of pressing with heat to obtain the first and second transmission flaps 62. Each of the first and second transmission flaps 62 has a distal end directed up toward the lateral walls 61. Note that it is possible to form the first and second transmission flaps 62 with the bottom cover 54 at one time according to injection molding by structuring molds for the bottom cover 54 with additional cores and cavities for the first and second transmission flaps 62. Furthermore, a recess 19 is formed in a front edge of the middle wall 60. The regulator flap 65 as a regulator mechanism is disposed inside the recess 19 and protrudes in the withdrawing direction. For each self-developing photo film unit of the peel-apart type, the regulator flap 65 operates in regulating movement of the image receiving sheet 41 by contact with the back surface of the image receiving sheet 41 in the course of pulling of each photo film unit. There is a pattern of plural projections 66 disposed on a top face of the regulator flap 65.

A light-shielding sheet 42 and the photo film units are secured to the pressure plate 53, and are contained in the pack body 52 together. The bottom cover 54 is mounted on the pack body 52 by the sliding operation to obtain an instant photo film pack 70. Then the first and second transmission flaps 62 disposed on the bottom cover 54 enter the first and second cutouts 55 formed in the walls of the pack body 52, contact bottom edges of the first and second lateral walls 58 of the pressure plate 53, and push up the pressure plate 53 toward the pack body 52. As a result, the light-shielding sheet 42 located in the uppermost position is pressed against an upper inside wall of the pack body 52, to close an exposure opening 3 in a light-tight manner.

The photo film pack is inserted in the pack holder 24 in FIG. 2 in the same manner as the prior art. In FIG. 3A, the instant photo film pack 70 of the present invention is depicted with the pack holder 24. When the pack holder 24 is loaded with the instant photo film pack 70, the first and second spring portions 35 of the second plate 27 push up the first and second transmission flaps 62 formed on the bottom cover 54 of the pack case 50. As the first and second transmission flaps 62 contact the lateral walls 61 of the pressure plate 53, a biasing force of the first and second spring portions 35 causes the pressure plate 53 to keep the instant photo film pack 70 pushed up. A top face of the pack body 52 contacts the inside of the first plate 30 of the pack holder 24, so that the instant photo film pack 70 is positioned with reference to the direction of the photographic optical path.

The projection 37 on the inside of the second plate 27 pushes up the regulator flap 65 on the bottom cover 54 of the instant photo film pack 70, so as to lift the light-shielding sheet 42 protruded through the passage opening defined under the end wall 7 of the pack body 52. When a front end of the light-shielding sheet 42 is pinched and pulled through a tab exit slot 44 in the pack holder 24, the light-shielding sheet 42 advances to the outside of the instant photo film pack 70. The biasing force of the first and second spring portions 35 lifts the pressure plate 53 to an extent of the thickness of the light-shielding sheet 42. Thus the first one of the photo film units are pressed against the inside wall of the pack body 52, to be ready for taking an exposure.

Similarly, an exposure is taken. The tab 45 of one photo film unit is pulled out. Also the withdrawing sheet 43 as an auxiliary sheet is drawn through the position between the spreader rollers 25. Thus the photosensitive sheet 40 is moved horizontally to the left in the drawing, is turned back at the semi-cylindrical portion 56 of the pressure plate 53, and is moved to the bottom of the pressure plate 53. The developing solution pod 46, which is disposed on the withdrawing sheet 43, is moved past the image receiving sheet 41 and comes nearer to the spreader rollers 25. As is well-known in the art, when the mask sheet 47 as another auxiliary sheet is spread and fully unfolded, the exposed surface of the photosensitive sheet 40 comes to a position opposite to the image receiving sheet 41. Force of withdrawing the withdrawing sheet 43 causes the combination of the photosensitive sheet 40 and the image receiving sheet 41 to move toward the spreader rollers 25.

While the photosensitive sheet 40 moves before coming to lie on the image receiving sheet 41, the back surface of the image receiving sheet 41 is continuously pushed by the top face of the regulator flap 65 having the projections 66, so that the image receiving sheet 41 is kept from moving. Therefore the photosensitive sheet 40 and the image receiving sheet 41 move to the position between the spreader rollers 25 in a state laid on each other completely.

The withdrawing sheet 43 is further drawn out. Shortly before the photosensitive sheet 40 and the image receiving sheet 41 come to a position between the spreader rollers 25, the solution pod 46 is squeezed by the spreader rollers 25. The developing solution in the solution pod 46 is spread between the photosensitive sheet 40 and the image receiving sheet 41 at a regularized thickness during the pulling operation. After each photo film unit is completely pulled out of the spreader rollers 25, predetermined time for development and fixation is elapsed. Then a positive image appears on the image receiving sheet 41, which is peeled away from the photo film unit to become a photographic print.

After exiting of the first photo film unit, the first and second spring portions 35 of the second plate 27 lift the pressure plate 53 in contact with the first and second transmission flaps 62. A second one of the photosensitive sheets 40 is pressed against the inside wall of the pack body 52 to be ready for another exposure. The first and second transmission flaps 62, even when shifted in their uppermost position, receive the biasing force of the first and second spring portions 35. The first and second transmission flaps 62 are kept movable by the inside of the first and second cutouts 55 of the pack body 52. Any of the photosensitive sheets 40 of the photo film units, inclusive of the tenth one, can be pressed against the inside wall of the pack body 52.

As described heretofore, the first and second transmission flaps 62 on the bottom cover 54 is pushed by the first and second spring portions 35 in the second plate 27 in the present embodiment. It is therefore possible to exert a stabilized biasing force in comparison with that of only plastic parts. The photosensitive sheet 40 of each of the photo film units at the exposure opening 3 can be positioned in the desired exposure position. Note that the resiliency of the transmission flaps 62 is effective in pushing up the pressure plate 53. Even when the instant photo film pack 70 is handled alone during transportation or the like, the pressure plate 53 and the photo film units are kept stable inside the pack case 50 without unwanted displacement.

Figure 4:
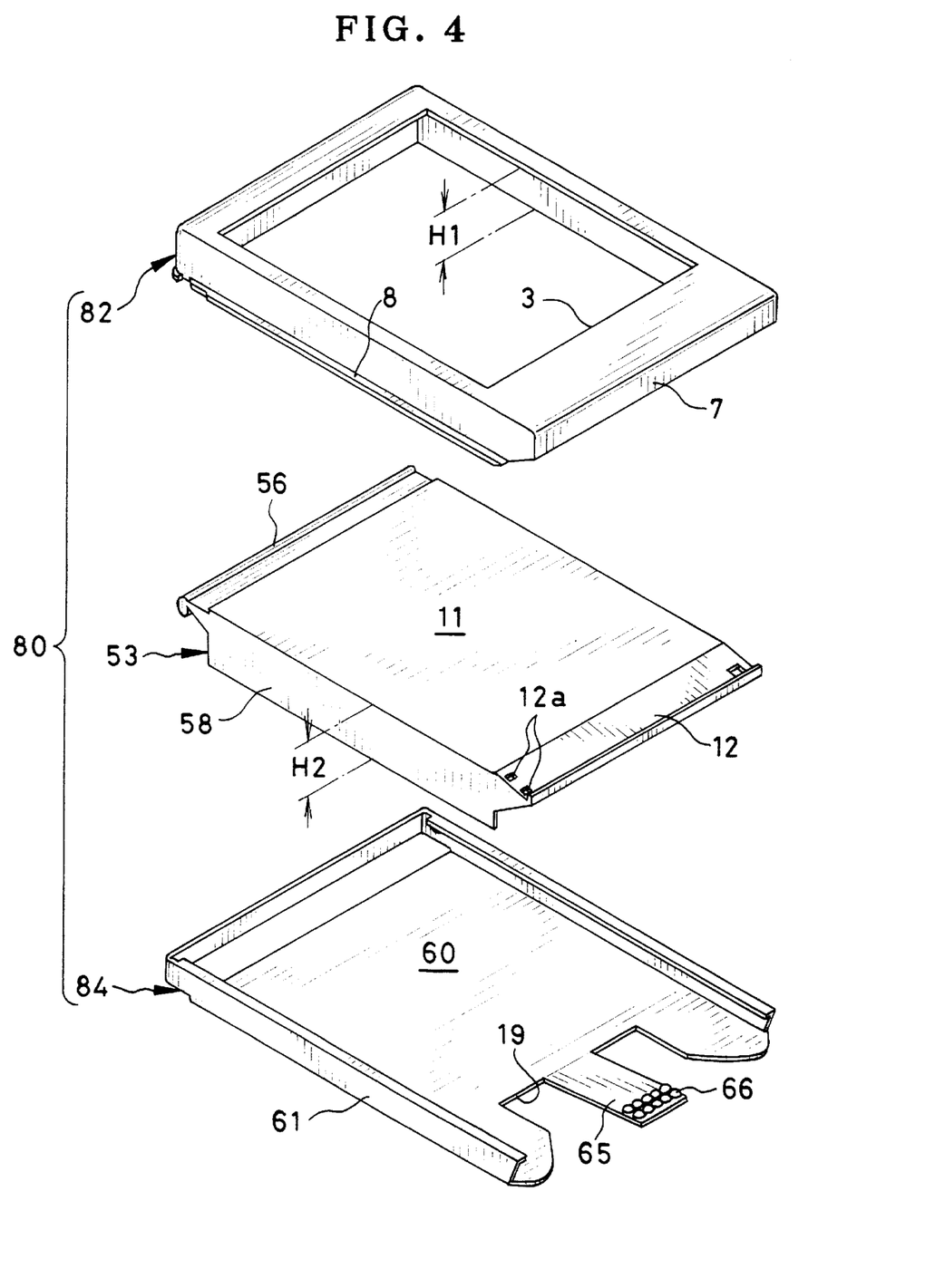
FIG. 4 is an exploded perspective illustrating a pack case of another preferred instant photo film pack.

In FIG. 4, another preferred instant photo film pack 70 is illustrated. A pack case 80 is constituted by a pack body 82, a bottom cover member 84 and the pressure plate 53, each of which is a plastic molded piece. In the pack case 80, the bottom cover 84 itself mounted on the pack body 82 is slidable toward the exposure opening 3 formed in the pack body 82. Lateral walls are formed with a middle wall of the pack body 82, but only protrude to the level of the ridges 8. Furthermore, the ridges 8 have a limited thickness which is smaller than a height with which a portion of the lateral walls 61 of the bottom cover 84 is bent. Consequently the bottom cover 84 is kept movable away from and toward the middle wall of the pack body 82 by placing the ridges 8 on the inside of the lateral walls 61 for connection of the pack body 82 and the bottom cover 84.

Let H1 be a height of an inside surface of the pack body 82 in a vertical direction. Let H2 be a height of the first and second lateral walls 58 of the pressure plate 53. The pack body 82 and the pressure plate 53 of the embodiment satisfy the condition of:

$H1<H2$.

Thus a bottom edge of the first and second lateral walls 58 of the pressure plate 53 is supported by the middle wall 60 of the bottom cover 84. In a manner similar to the above embodiment, the photosensitive sheet 40 of the photo film units is accommodated between the middle wall 11 of the pressure plate 53 and the inner face of the pack body 82. The image receiving sheet 41 is accommodated between a bottom face of the middle wall 11 and the bottom cover 84. Remaining structures of the pack case 80 are the same as those of the embodiment of FIG. 1. Elements similar to those of the above embodiments are designated with identical reference numerals.

When the instant photo film pack 70 is inserted in the pack holder 24, the first and second spring portions 35 of the second plate 27 pushes up the bottom cover 84 of the pack case 80. As the first and second lateral walls 58 of the pressure plate 53 are supported by the middle wall 60 of the bottom cover 84, the pressure plate 53 is also pushed upwards with the bottom cover 84. A front surface of the pack body 82 is positioned in contact with the inner face of the pack holder 24. The photosensitive sheet 40 of a first one of the photo film units is pressed against an inner face of the pack body 82 by the pressure of the pressure plate 53, so as to stand by for taking an exposure.

The number of the photo film units as contained in the instant photo film pack 70 is decreased at each time that one photo film unit is withdrawn upon taking an exposure. The photosensitive sheet 40 of each one of the photo film units directly behind the exposure opening 3 is pressed against the inner face of the pack body 82 in a predetermined manner, because the first and second spring portions 35 of the second plate 27 push up the bottom cover 84 and also the pressure plate 53 toward the exposure opening 3. The height H2 of the first and second lateral walls 58 of the pressure plate 53 is predetermined greater than the inner height H1 of the pack body 82. Even when a final one of the photo film units remains in the instant photo film pack 70, the biasing force of the first and second spring portions 35 is safely transmitted to the pressure plate 53 by the bottom cover 84. Therefore the photosensitive sheet 40 of any of the photo film units can be positioned suitably behind the exposure opening 3. The pressure plate 53 in the pack case 80 is structurally pushed by shifting of the bottom cover 84. Thus no cutout or recess is required in the middle wall 60 of the bottom cover 84, which is effective in keeping a high strength of the bottom cover 84.

In the present embodiment, the pack body 82 and the pressure plate 53 satisfy the condition of:

$H1<H2$.

However it is possible that the pack body 82 and the pressure plate 53 satisfy the condition of:

$H1=H2$ so that the photosensitive sheet 40 of the final one of the photo film units can be positioned behind the exposure opening 3 in the pack body 82.

In the present invention, it is possible to construct an instant photo film pack in different manners from the above embodiment. For example, the first and second transmission flaps 62 or the regulator flap 65 produced from plastic material may be separately prepared as pieces, and may be secured to the middle wall 60 by fitting thereto or ultrasonic welding. Shapes of the first and second transmission flaps 62 or the regulator flap 65 may be changed suitably. In the above embodiment, the projections 66 are formed on the top surface of the regulator flap 65. Instead, a pattern including a number of small recesses or gaps may be formed in the top surface of the regulator flap 65 for the purpose of obtaining high friction. The features of the present invention are particularly effective in using the pressure plate 53 and the bottom cover 54, 84 fully formed from the plastic material. Thus it is additionally possible that, instead of the regulator flap 65, a sponge sheet or plastic foam sheet is attached to the bottom cover 54, 84.

In the above embodiment, the pack case is constituted by the combination of the pack body 52 and the bottom cover 54. However the pack case may be one piece molded by injection molding. For this structure, the pack body 52 and the bottom cover 54 can be molded in a form connected by a hinge portion with a small thickness. After the molding, the bottom cover 54 can be bent at the hinge portion and laid on the pack body 52. Free ends of the bottom cover 54 and the pack body 52 can be retained on each other by engaging claws or hooks for securing the free end of the bottom cover 54 to that of the pack body 52. The pressure plate 53, of course, may be inserted into the pack case before securing the free ends of the bottom cover 54 and the pack body 52.

In the above embodiments, the photo film pack is oriented vertically when used with the instant camera. However the photo film pack when used in an optical instrument may be oriented in any direction in the present invention, for example horizontally, so that a relevant optical instrument such as an instant camera may have an exit in its front, and that the photo film units may be pulled forwards out of the camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant photo film pack loadable in a pack holder, including a pack and a plurality of stacked self-developing photo film units contained therein;

said pack including a box-shaped pack case and a pressure plate contained therein, said pack case having an exposure opening formed in an upper wall thereof and a passage opening formed with a front wall thereof, said pressure plate being provided with a pair of lateral walls so as to separate an inside of said pack case into upper and lower chambers;

each of said photo film units including a photosensitive sheet contained in said upper chamber, an image receiving sheet contained in said lower chamber, a withdrawing sheet having an edge connected with said photosensitive sheet, a developing solution pod, disposed on said withdrawing sheet, for containing developing solution, a mask sheet having an edge connected with said withdrawing sheet, a mask opening formed in said mask sheet, said image receiving sheet being disposed behind said mask opening to close said mask opening, and secured thereto in a peelable manner;

said instant photo film pack comprising:
      said pack case and said pressure plate being plastic molded pieces;

a biasing force transmission member, disposed on a bottom wall of said pack case, for transmitting a biasing force of a spring member on an inside of said pack holder to said pressure plate, to push said pressure plate toward said exposure opening; said biasing force transmission member being inclined upward toward one of said lateral walls.

2. The instant photo film pack as defined in claim 1, further comprising a regulator member, disposed under said passage opening, for contacting a back surface of said image receiving sheet, to exert frictional force for preventing said image receiving sheet from moving toward said passage opening before said image receiving sheet becomes laid acceptably on said photosensitive sheet during pulling of each of said photo film units.

3. The instant photo film pack as defined in claim 2, wherein said pack holder includes a holder body for containing said instant photo film pack, an upper cover plate for closing said holder body in an openable manner, said spring member disposed on an inside of said holder body for pushing said pack toward said upper cover plate, a holder opening positioned with said exposure opening in said pack case, a pair of spreader rollers for spreading said developing solution between said photosensitive sheet and said image receiving sheet by squeezing said solution pod, a photo film exit slot, formed in a front end wall of said holder body, for passage of each of said photo film units passed between said spreader rollers.

4. The instant photo film pack as defined in claim 3, wherein said pack case includes a pack body of which a bottom is open, and a bottom cover secured to said pack body to close said bottom, said exposure opening being formed in said pack body, and said passage opening being defined between said pack body and said bottom cover.

5. An instant photo film pack loadable in a pack holder, including a pack and a plurality of stacked self-developing photo film units contained therein;

said pack including a box-shaped pack body, a bottom cover secured to a bottom of said pack body, a pressure plate contained between said pack body and said bottom cover, and a passage opening defined between said pack body and said bottom cover, said pack body having an exposure opening formed in an upper wall thereof, said pressure plate being provided with a pair of lateral walls so as to separate an inside of said pack body into upper and lower chambers;

each of said photo film units including a photosensitive sheet contained in said upper chamber, an image receiving sheet contained in said lower chamber, a withdrawing sheet having an edge connected with said photosensitive sheet, a developing solution pod, disposed on said withdrawing sheet, for containing developing solution, a mask sheet having an edge connected with said withdrawing sheet, a mask opening formed in said mask sheet, said image receiving sheet being disposed behind said mask opening to close said mask opening, and secured thereto in a peelable manner;

said instant photo film pack comprising:
      said pack body, said bottom cover and said pressure plate being plastic molded pieces;
      at least one pair of transmission flaps, produced from plastic material, disposed on lateral edges of said bottom cover, deformed by a biasing force of a spring member on an inside of said pack holder to said pressure plate, for pushing said pressure plate toward said exposure opening in contact with said lateral walls;

wherein said transmission flaps extend with an inclination and in a direction substantially perpendicular to a withdrawing direction of said photo film units.

6. The instant photo film pack as defined in claim 5, wherein said transmission flaps are included in said plastic molded piece of said bottom cover.

7. The instant photo film pack as defined in claim 6, wherein said transmission flaps are defined by a channel-shaped slit formed in said bottom cover, have four side lines, are separated from said bottom cover along three of said four side lines, and remain connected with said bottom cover along a remaining one of said four side lines.

8. An instant photo film pack loadable in a pack holder, including a pack and a plurality of stacked self-developing photo film units contained therein;

said pack including a box-shaped pack body, a bottom cover secured to a bottom of said pack body, a pressure plate contained between said pack body and said bottom cover, and a passage opening defined between said pack body and said bottom cover, said pack body having an exposure opening formed in an upper wall thereof, said pressure plate being provided with a pair of lateral walls so as to separate an inside of said pack body into upper and lower chambers;

each of said photo film units including a photosensitive sheet contained in said upper chamber, an image receiving sheet contained in said lower chamber, a withdrawing sheet having an edge connected with said photosensitive sheet, a developing solution pod, disposed on said withdrawing sheet, for containing developing solution, a mask sheet having an edge connected with said withdrawing sheet, a mask opening formed in said mask sheet, said image receiving sheet being disposed behind said mask opening to close said mask opening, and secured thereto in a peelable manner;

said instant photo film pack comprising:
said pack body, said bottom cover and said pressure plate being plastic molded pieces;
said bottom cover being so associated with said pack body as to move with said pressure plate toward said exposure opening in response to a biasing force of a spring member on an inside of said pack holder;

wherein said regulator member is included in said plastic molded piece of said bottom cover.

9. An improvement as defined in claim 8, further comprising a recess formed in said bottom cover and disposed under said passage-opening, said regulator member being protruded from said recess.

10. An improvement as defined in claim 9, further comprising plural projections disposed to project from a free end of said regulator member.

11. An instant photo film pack loadable in a pack holder, including a pack and a plurality of stacked self-developing photo film units contained therein;

said pack including a box-shaped pack case and a pressure plate contained therein, said pack case having an exposure opening formed in an upper wall thereof and a passage opening formed with a front wall thereof, said pressure plate being provided with a pair of lateral walls so as to separate an inside of said pack case into upper and lower chambers;

each of said photo film units including a photosensitive sheet contained in said upper chamber, an image receiving sheet contained in said lower chamber, a withdrawing sheet having an edge connected with said photosensitive sheet, a developing solution pod, disposed on said withdrawing sheet, for containing developing solution, a mask sheet having an edge connected with said withdrawing sheet, a mask opening formed in said mask sheet, said image receiving sheet being disposed behind said mask opening to close said mask opening, and secured thereto in a peelable manner;

said instant photo film pack comprising:
a regulator member, having plural projections at a tip end thereof, disposed under said passage opening, for contacting a back surface of said image receiving sheet, to exert frictional force for preventing said image receiving sheet from moving toward said passage opening before said image receiving sheet becomes laid acceptably on said photosensitive sheet during pulling of each of said photo film units.

* * * * *